Aug. 2, 1960
J. H. BORDEN
2,947,873
AMPLIFIER FOR SAFE-RAY
Filed Sept. 23, 1955
2 Sheets-Sheet 1
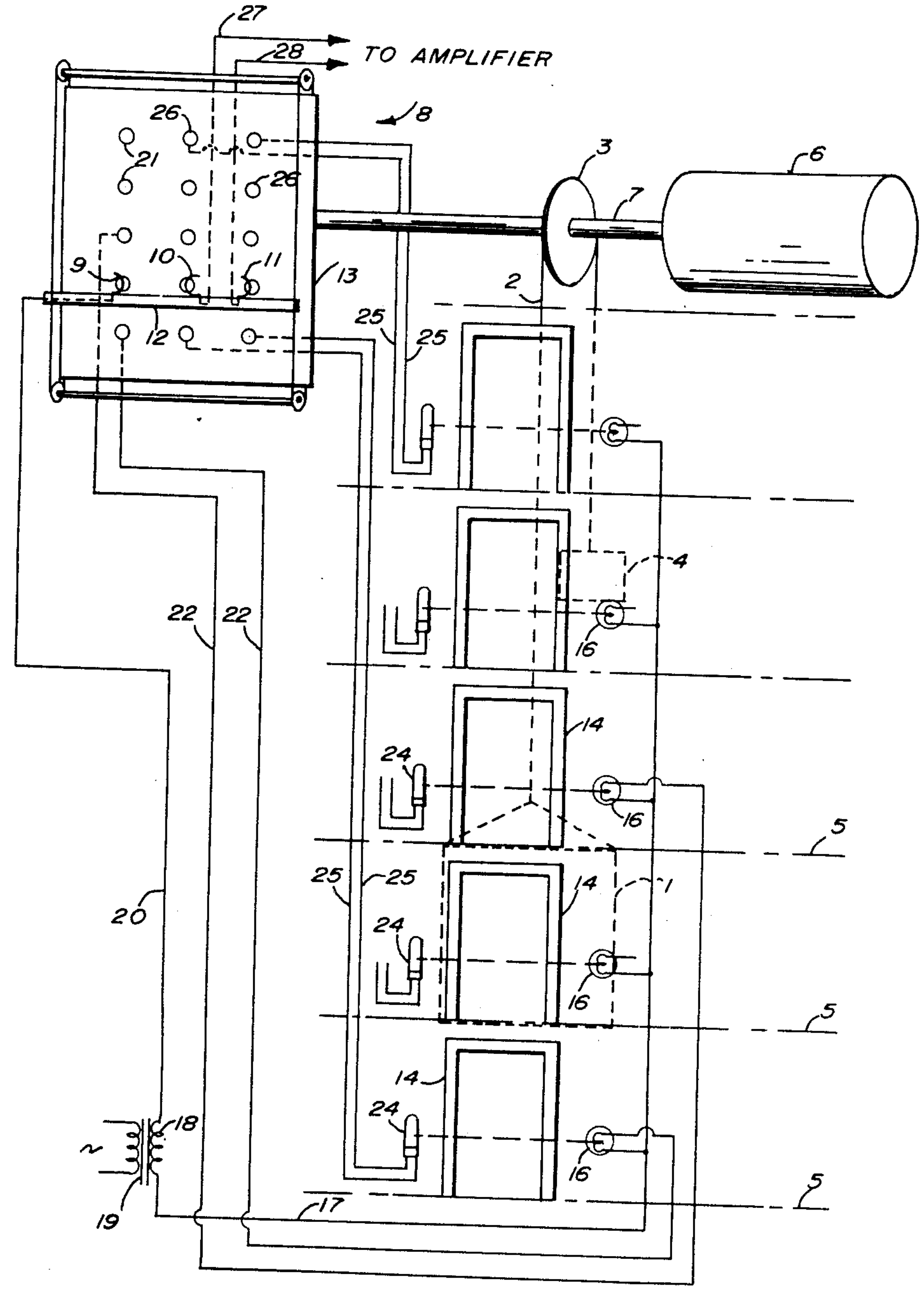
Fig. I
INVENTOR.
JOSEPH H. BORDEN
BY
Marshall, Marshall & Yeasting
ATTORNEYS

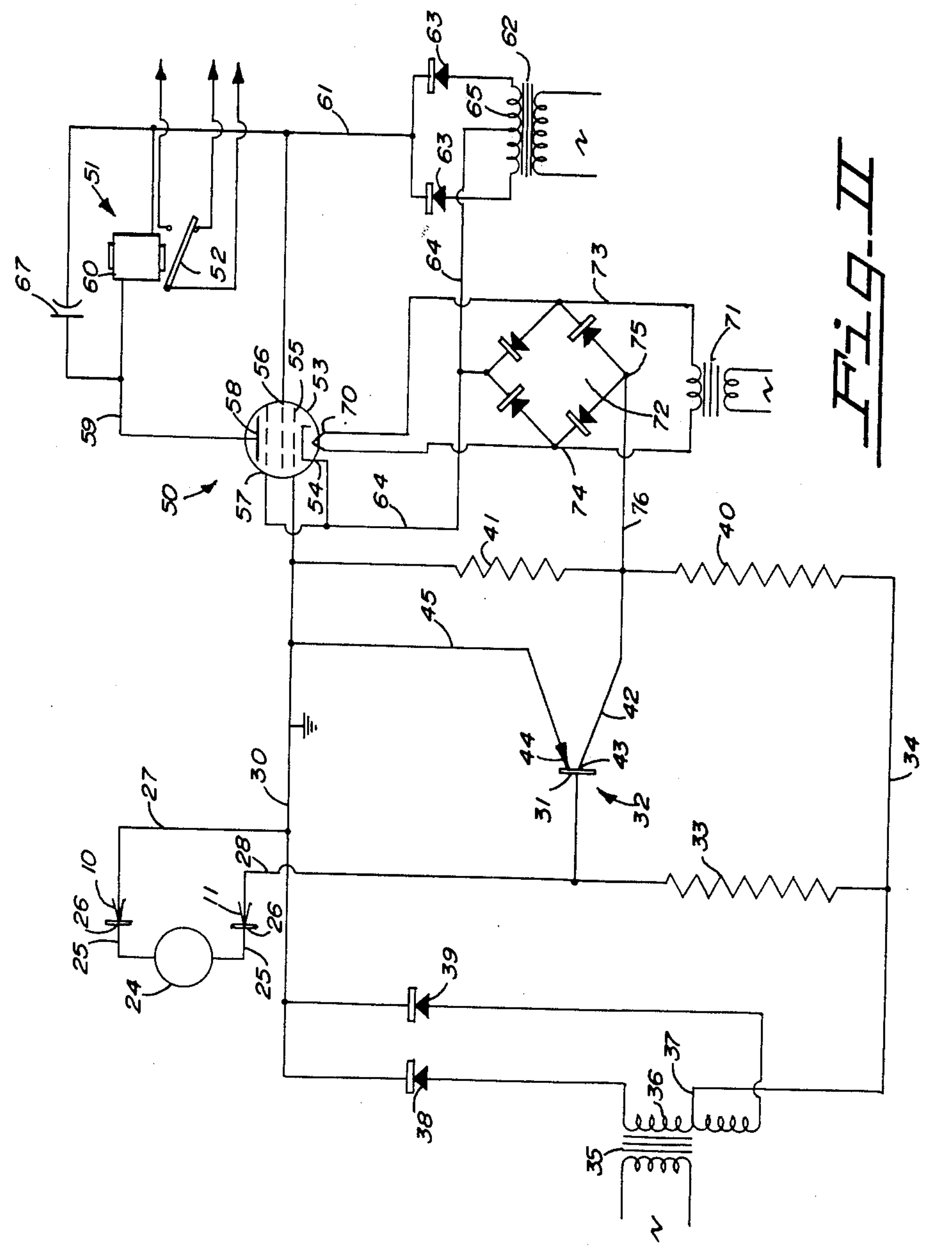
Fig. II
INVENTOR.
JOSEPH H. BORDEN
BY
Marshall, Marshall and Yeasting
ATTORNEYS United States Patent Office 2,947,873
Patented Aug. 2, 1960

2,947,873

AMPLIFIER FOR SAFE-RAY

Joseph H. Borden, Toledo, Ohio, assignor to Toledo Scale Corporation, a corporation of Ohio Filed Sept. 23, 1955, Ser. No. 536,099
4 Claims. (Cl. 250—206)

This application relates to elevator electrical control circuits and particularly to a photoelectric amplifier system for elevator safety controls.

Photoelectric systems have been employed in elevators for guarding the entrances to the elevator cars. As usually employed the photoelectric cells respond to light beams directed across the doorway to a car and are arranged to interrupt or prevent door closing operations or starting of an elevator car as long as an object is in the doorway so as to interfere with such door closing operation. These systems, in general, have been unreliable when applied to the hallway doors of an elevator system unless a separate amplifier is used for each of the plurality of photoelectric cells one for each door. It is desirable to eliminate as many amplifiers as possible and for that reason attempts have been made to use one amplifier to respond to a number of photocells located at several of the doorways of an elevator system. Difficulties are usually encountered because of the problems of switching the leads from one photocell to another photocell as the elevator responds or travels to the various floors, because of the long leads required between the photocells and the amplifier, and because of individual differences between the photocells.

The principal object of this invention is to provide a photocell amplifier control system that is reliable in operation even when the amplifier is separated by a great distance from the cooperating photoelectric cell.

Another object of the invention is to provide an amplifier control circuit that is stable in operation and not materially affected by electrostatic or electromagnetic pickup from associated or nearby circuits.

A still further object of the invention is to provide a photoelectric control amplifier system in which leads may be switched from photocell to photocell without materially interferring with the operation of the control circuit.

A still further object of the invention is to provide a photoelectric amplifier control circuit that may be readily employed with selectively connected photocells without materially affecting the adjustment of the circuit or its response to interruption of light beams to the various photocells.

An ancillary object of the invention is to provide a photocell amplifier employing a transistor in which the power supply for the transistor is arranged to minimize drift or saturation effects in the transistor.

These and more specific objects and advantages are attained in a photoelectric system constructed according to the invention.

According to the invention, self generating photoelectric cells of comparatively low impedance are employed at each of the hallway doors or at least some of the hallway doors of the elevator system. The photocells are connected selectively through a floor selector mechanism of the elevator to an amplifier arranged to control elevator car door closing operations. The circuit is arranged so that an open circuit to the photoelectric cell corresponds to an interruption of the light beam thus providing a "fail safe" system and is further arranged so that the amplifier may easily withstand the voltages impressed when one photocell is disconnected and before another is connected as when the floor selector machine moves from floor to floor and selectively connects the respective photocells into the circuit. The amplifier is further arranged so as to operate in a dynamic manner, that is without steady or D.C. voltages applied to the various elements even though the light received by the photoelectric cell is substantially constant. This last effect is obtained by supplying the photoelectric cell and its transistor amplifier with pulsating direct current rather than with a steady direct current voltage.

A preferred form of the invention is illustrated in the accompanying drawings.

In the drawings:

Figure I is a schematic diagram illustrating the arrangement of the photoelectric cells, light sources and floor selector machine for cooperating with an elevator car that serves a plurality of floors.

Figure II is a schematic wiring diagram illustrating the circuits of the amplifier.

These specific figures on the accompanying description are intended merely to illustrate the invention and not to impose limitations on its scope.

Referring to Figure I an elevator car 1 is shown suspended by a cable 2 that is trained over a drive sheave 3 and connected to a counterweight 4. The elevator car is driven past a plurality of floors 5 by rotation of the sheave 3 by an elevator drive motor 6. The elevator drive sheave 3 or motor 6 has its armature shaft 7 drivingly connected to a floor selector machine 8 that has a plurality of brushes 9, 10 and 11 mounted on a carriage 12 that is moved up and down over the face of a contact board 13 of the floor selector machine 8.

Each of the floors 5 is provided with a hallway door 14 for providing access to the elevator car 1 when the car is positioned at that floor. As is well known in the elevator art, the hall doors may be automatically coupled to the car door to open with the car door when the car arrives at the floor.

Each of the hallway doors 14 is provided with a light source 16 one side of each light source circuit being connected through a lead 17 to a low voltage winding 18 of a transformer 19. The other terminal of the low voltage winding 18 is connected through a lead 20 to the brush 9 of the floor selector machine 8. The brush 9 cooperates with a series of contacts 21 which are individually connected through leads 22, only two of which are shown, to the light sources 16. In this arrangement each of the light sources 16 is energized as long as the car is near or at that floor. If desired, contacts of the stopping circuits or door control circuits may be included in the lead 20 so that the light sources are illuminated or energized only in the event that the car stops and opens its door at the floor. This prevents flashing of the lights as the car moves up and down the hatchway and travels past intermediate floors to answer other calls.

Each of the light sources 16, when energized, projects a beam of light across the corresponding hallway door 14 to a photoelectric cell 24 mounted on the opposite side of the doorway. The photocells 24 are individually connected through leads 25 to corresponding rows of contacts 26 of the floor selector machine 8. The contacts 26 cooperate with brushes 10 and 11 connected to amplifier leads 27 and 28 respectively that are connected to an amplifier that at least in part controls door closing operation.

Referring now to Figure II it will be noted that the photoelectric cell 24 is connected through leads 25 and selector machine contacts 26 to brushes 10 and 11 which, in turn, are connected through the leads 27 and 28 to the amplifier. The lead 27 is connected to a grounded lead 30 while the lead 28 is connected directly to a base electrode 31 of a transistor 32. The base electrode 31 is also connected through a high resistance 33 to a negative high voltage lead 34.

The lead 34 is maintained at a high negative voltage by means of a power transformer 35 having a secondary winding 36 the center tap 37 of which is connected to the lead 34 while the end taps are connected through rectifiers 38 and 39 to the grounded lead 30. The rectifiers 38 and 39 are polarized so as to pass current from the windings to the grounded lead 30 thus driving the center tap 37 negative with respect to ground. No filter condenser or filtering arrangement is employed. Therefore, the voltage on the negative lead 34 is a pulsating or full wave rectified voltage.

The voltage between ground and the negative lead 34 is applied across a voltage divider comprising resistors 40 and 41 the junction of which resistors is connected through a lead 42 to a collector electrode 43 of the transistor 32. An emitter electrode 44 is connected through lead 45 directly to the grounded lead 30.

In the operation of this circuit, with the photocell dark or disconnected, current flows from the grounded lead 30 through the lead 45 into the transistor 32 through its emitter electrode 44 and out through the base electrode and thence through the resistor 33 connected to the return lead 34. The resistor 33 has a high resistance in the neighborhood of 1½ megohms so that the current flow through this path is quite small. At the same time due to the amplifying action of the transistor 32 a larger current flows through the lead 45 into the transistor through its emitter 44 and out through its collector electrode 43 and thence through the lead 42 and resistor 40 to the negative return lead 34. The current flow through this second path in effect by-passes the resistor 41 so that there is very little or no voltage between the grounded lead 30 and the lead 42 connected to the junction between the resistors 41 and 40. In a preferred embodiment of the circuit the resistor 40 is made approximately 70,000 ohms while the resistor 41 is approximately 10,000 ohms.

When the photocell 24 is connected into the circuit and light is admitted to the photoelectric cell, the photocell (of a self-generating type such as a selenium cell) drives the lead 28 positive with respect to the lead 27 thereby attempting to or actually reversing the current flow from emitter to base through the transistor 32. The base electrode 31 is thus driven slightly positive with respect to the grounded lead 30 thereby cutting off or reducing all current flow through the transistor and thus presents a substantially open circuit between the leads 45 and 42. By stopping the current flow through this path the voltage on the lead 42 immediately goes negative with respect to the lead 30 by an amount dependent upon the internal resistance in this condition of the transistor 32 and the ratio of resistors 40 and 41. Ordinarily with the photoelectric cell light the lead 42 is approximately six volts negative with respect to the grounded lead 30.

The output voltage of the transistor amplifier appearing between the leads 30 and 42 is applied to a thermionic amplifier stage 50 that includes a relay 51 in the plate circuit of the thermionic amplifier stage arranged to control contacts 52 that are connected in or may be used to jointly control door closing circuits.

The thermionic amplifier stage 50 includes a pentode amplifier 53 having a cathode 54, control grid 55 that is connected directly to the grounded lead 30, a screen grid 56, a suppressor grid 57 connected to the cathode 54, and an anode or plate 58. The anode or plate 58 is connected through a lead 59 to a coil 60 of the relay 51 and thence to a positive lead 61. The lead 61 is maintained positive with respect to cathode by a power transformer 62 and rectifiers 63, the cathode 54 being connected through a lead 64 to a center tap of a secondary winding 65 of the power transformer 62 while the end terminals of the secondary winding 65 are connected through the rectifiers 63 to the positive lead 61. The screen grid 56 of the amplifier 53 is connected directly to the positive lead 61. Furthermore, to eliminate chatter of the relay, a condenser 67 is connected in parallel with the coil 60.

The amplifier 53 has a heater 70 that is supplied with current from a filament transformer 71 supplying approximately six volts alternating current. A full wave rectifier 72 is connected between terminals 73 and 74 of the filament transformer 71. One output terminal of the full wave rectifier 72 is connected directly to the lead 64 which is connected to the cathode 54 of the amplifier tube 53. The opposite terminal 75 of the full wave rectifier 72 is connected through a lead 76 to the lead 42, which is the output lead of the transistor amplifier 32. The full wave rectifier 72 furnishes grid bias voltage for the amplifier 53, this voltage being in a direction tending to hold the cathode 54 approximately six to eight volts positive with respect to the lead 76. Since the filament winding of the transformer 71 is not grounded nor is the heater 70 connected to the cathode the system floats or varies in potential with respect to the grounded lead 30 according to the signal voltage of the transistor amplifier. When the photocell is dark or disconnected there is no voltage across the voltage divider resistor 41, all the curent flowing through the transistor emitter 44 and collector 43, the amplifier 53 has six to eight volts bias between its cathode 54 and its control grid 55. This is sufficient to cut off the flow of plate current. When the photocell is illuminated and connected to the transistor amplifier the voltage on the lead 76 goes negative with respect to the lead 30 sufficiently to cancel the bias voltage obtained from the full wave rectifier 72 thereby decreasing the bias between the cathode and the grid of the amplifier enough to permit the flow of plate current to energize the relay 51.

The transformers 35, 71 and 62 must be supplied from the same or synchronized sources of alternating voltage so that the pulsating direct current supplied to the lead 34 in the negative sense and to the lead 61 in the positive sense and the pulsating bias voltage developed between the leads 64 and 76 by the full wave rectifier 72 is in phase. When the pulsating voltages are in phase, the amplifier, although operating on varying voltage, performs essentially the same as if the voltages were steady as with a filtered voltage supply. Likewise, the voltages for the transistor 32 vary in like maner so that even though a steady beam of light may be applied to the photocell 24 and thus provide a steady direct current output from the cell the transistor itself is operating on a substantially pulsating current. It has been found from experiment that the amplification ratio of the transistor 32 is much more constant with change in circuit constants, time and temperature if the transistor operates on a fluctuating current than if it is operated on a steady direct current.

By thus applying a pulsating current to the amplifier several advantages are obtained. Besides the just mentioned stability of the transistor there is an advantage in a reduction in the number of circuit components required in the circuit.

The relative low impedance of the photoelectric cell of the self-generating type makes it possible to operate with considerable length of line in the leads 25 or the leads 27 and 28 without picking up enough stray voltages or induced curents to affect the operation of the circuit or reduce its sensitivity or reliability.

Various modifications may be made in detail of the circuits without losing the advantages of the improved circuit or departing from the scope of the claims.

Having described the invention, I claim:

1. In a photoelectric relay circuit, in combination, a source of direct current, a voltage divider circuit connected across said source, a three terminal semi-conductor amplifier having emitter, base, and collector electrodes with the emitter electrode connected to a positive lead of said source and with the collector connected to an intermediate point of the voltage divider, a resistor connected between the base electrode of the amplifier and the negative lead of the current source, a current generating photoelectric cell connected directly between the positive lead of the current source and the amplifier base electrode to reduce the voltage between the emitter and base electrodes with increase in light, and a signal utilization circuit connected between the emitter and collector electrodes.

2. In a photoelectric relay circuit, in combination, a plurality of current generating photoelectric cells, a three terminal semi-conductor amplifier having a base electrode, an emitter electrode and a collector electrode, said photocells being selectively connected directly between the base and emitter electrodes to apply a positive voltage to the base in response to light, a high impedance source of direct current connected to pass current through the amplifier in opposition to the photocell current, means for biasing the collector electrode negative with respect to the emitter, and a signal utilization circuit connected between the emitter and collector electrodes.

3. In a photoelectric relay circuit, in combination, a semi-conductor amplifier having a base electrode, an emitter electrode, and a collector electrode, a resistance voltage divider connected to apply voltage to the collector electrode to bias it negative with respect to the emitter electrode, a signal utilization circuit connected between the collector and emitter electrodes, a biasing voltage circuit connected to the base electrode to bias the base negative with respect to the emitter, a current generating photoelectric cell connected between the base and emitter and arranged to reduce the negative bias of the base with increase in light, and means for supplying the voltage divider and biasing circuits with pulsating current.

4. In a photoelectric relay circuit, in combination, a low impedance current generating photoelectric cell, a three terminal semi-conductor current amplifier having an input current path and an output current path therethrough, said photocell being connected across two terminals of said current amplifier to pass current through the input current path in response to light, a source of direct current, a high resistance circuit connecting said source to said amplifier to pass current through the input current path in opposition to the photocell current, a resistance voltage divider circuit connected across said source and having a portion of the divider circuit connected in parallel with the output current path of the amplifier, and a utilization circuit connected in parallel with the output current path of the amplifier.

References Cited in the file of this patent

UNITED STATES PATENTS

| | | |
|---|---|---|
| 1,822,152 | Kinnard | Sept. 8, 1931 |
| 1,947,079 | Ellis | Feb. 13, 1934 |
| 2,252,457 | Cockrell | Aug. 12, 1941 |
| 2,459,356 | Aubert | Jan. 18, 1949 |
| 2,499,921 | Hurley | Mar. 7, 1950 |
| 2,614,227 | Bordewieck | Oct. 14, 1952 |
| 2,644,893 | Gehman | July 7, 1953 |
| 2,682,624 | Atkins | June 29, 1954 |
| 2,693,572 | Chase | Nov. 2, 1954 |
| 2,745,021 | Kurshan | May 8, 1956 |
| 2,831,981 | Watts | Apr. 22, 1958 |
| 2,848,658 | Mitchell | Aug. 19, 1958 |